United States Patent Office.

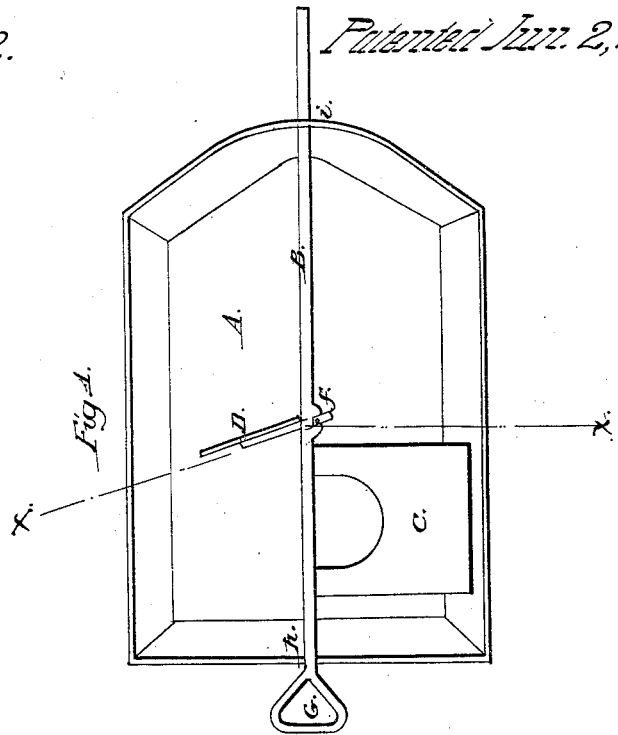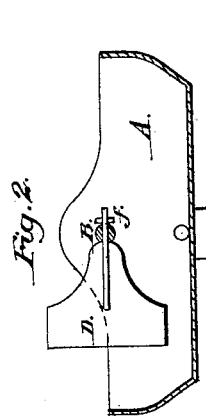

HOSEA WILLARD, OF VERGENNES, VERMONT.

Letters Patent No. 78,502, dated June 2, 1868.

IMPROVEMENT IN BUTTER-WORKER.

*The Schedule referred to in these Letters Patent and making part of the same.*

TO ALL WHOM IT MAY CONCERN:

Be it known that I, HOSEA WILLARD, of Vergennes, in the county of Addison, and State of Vermont, have invented a new and improved Butter-Worker; and I do hereby declare that the following is a full, clear, and exact description thereof, which will enable those skilled in the art to make and use the same, reference being had to the accompanying drawings forming part of this specification.

This invention relates to a new and improved machine for working butter.

And it consists in combining a rod or spindle, (having attached to it one or more wings, one of which is rigidly attached thereto, while the other may be revolved,) with a shallow pan, in which the butter to be worked is placed, as will be hereinafter more fully described.

Figure 1 represents a top or plan view of the butter-worker, showing the parts of which it is composed arranged according to my invention.

Figure 2 is a cross-section of fig. 1 through the line $x\ x$.

Similar letters of reference indicate corresponding parts.

A represents the pan.

B is the rod or spindle.

C is the wing which is fast to the rod, and immovable thereon.

D is the wing, which has a shank, $e$, attached to it, which shank passes through the rod B.

The shank has a hole through it, so that it can be attached to the rod by a key or pin, and when so attached, it will turn wholly or partially round, and adjust itself to the shape and position of the butter in the pan.

The shank and pin or key are seen at $f$.

Should there be no more than one wing on the rod, that one may be made fast or made to revolve, and should there be more than two wings, one or more may be fast or made to revolve, as may be desired.

G is the handle on the rod, for the operator to take hold of in working the butter.

The rod is left free, resting on the top edge of the pan, as seen at $h$.

The other end of the rod passes through a hole in the end of the pan, as seen at $i$.

It will be seen that the rod may be moved either way laterally and longitudinally, and the wings be brought in contact with all parts of the lump of butter for working it, and separating the liquid therefrom, as may be desired or necessary.

I claim as new, and desire to secure by Letters Patent—

The rod or spindle B, with the wings C and D connected therewith, in combination with a tray or trough, and operating substantially as and for the purposes herein shown and described.

The above specification of my invention signed by me, this 28th day of March, 1868.

HOSEA WILLARD.

Witnesses:
J. H. LUCIA,
W. W. BOOTH.